United States Patent [19]

Pawlowski et al.

[11] Patent Number: 5,098,474
[45] Date of Patent: Mar. 24, 1992

[54] DYES CONTAINING ALKYLAMINO GROUPS FOR INK-JET PRINTING INKS

[75] Inventors: Norman E. Pawlowski, Corvallis, Oreg.; Kenneth A. Norton, Arvada, Colo.

[73] Assignee: Hewlett-Packard Company, Palo Alto, Calif.

[21] Appl. No.: 547,544

[22] Filed: Jun. 29, 1990

Related U.S. Application Data

[63] Continuation-in-part of Ser. No. 266,191, Nov. 2, 1988, abandoned.

[51] Int. Cl.$^5$ ............................................. C09D 11/02
[52] U.S. Cl. ...................................... 106/22; 564/84; 564/86
[58] Field of Search .................. 106/22; 8/657, 658, 8/659, 661, 675, 676, 694; 564/84, 86

[56] References Cited

U.S. PATENT DOCUMENTS

| | | | |
|---|---|---|---|
| 3,096,322 | 7/1963 | Straley et al. | 8/694 |
| 3,352,846 | 11/1967 | Luetzel | 8/694 |
| 3,891,388 | 6/1975 | Neeff | 8/676 |
| 3,980,427 | 9/1976 | Neeff | 8/694 |
| 4,014,647 | 3/1977 | Neeff | 8/694 |
| 4,194,878 | 3/1980 | Burke et al. | 8/676 |
| 4,379,710 | 4/1983 | Crounse | 8/661 |
| 4,521,217 | 6/1985 | Beck et al. | 8/657 |
| 4,908,062 | 3/1990 | Balmforth et al. | 106/22 |
| 4,935,059 | 6/1990 | Mayer et al. | 106/22 |
| 4,940,783 | 7/1990 | Stingelin | 106/22 |

*Primary Examiner*—William R. Dixon, Jr.
*Assistant Examiner*—Helene Klemanski

[57] ABSTRACT

A dye used in ink compositions for ink-jet printing comprises an aromatic dye molecule having attached to the aromatic nucleus thereof from 2 to 10 alkylamino groups having the formula selected from the group consisting of:

(a) $-(CH_2)_n-NH_2$, where $n=2$ to 4,
(b) $-NH-(CH_2)_n-NH_2$, where $n=2$ to 5, and
(c) $-NH-(C_2H_4NH)_xC_2H_4NH_2$, where $x=0$ to about 100. These dyes have good water solubility at near neutral pH and interact well with paper.

14 Claims, No Drawings

DYES CONTAINING ALKYLAMINO GROUPS FOR INK-JET PRINTING INKS

CROSS REFERENCE TO RELATED APPLICATION

This application is a continuation-in-part of application Ser. No. 07/266,191, filed Nov. 2, 1988, now abandoned.

TECHNICAL FIELD

The present invention relates to dyes in ink compositions for ink-jet printing, and, more particularly, to dyes incorporating multiple alkylamino groups to improve the dye solubility and print quality.

BACKGROUND ART

Water-soluble dyes are commonly used for ink-jet printers in the form of a composition comprising the dye, water, and a water-miscible organic solvent, such as a glycol ether. A typical composition comprises water and ethylene glycol in equal proportions and up to about eight percent of a dye such as Food Black 2. The amount of dye is determined by the density of the print required. Such compositions are formulated to have, among other things, the viscosity and surface tension required for the ink-jet printing process. In addition, an important feature of such a composition is that the dye must have good water solubility, not only to provide the required print density, but also to avoid precipitation of the dye in the ink-jet nozzles to form a crust which blocks the nozzle. The latter problem arises when some of the water in the ink composition contained in the nozzle evaporates and the dye precipitates from solution to leave a crust in the nozzle. Over a period of time, this crust builds and causes partial and subsequently full blockage of the nozzle.

One approach to solving this problem has been to incorporate sulfonate groups, $SO_3$, in the dye with the associated cation, such as sodium, potassium, lithium, ammonium, and amine salt cations. Such dyes are described, for example, in U.S. Pat. No. 4,557,761. However, dyes with good water solubility generally have three disadvantages with regard to their interaction with paper. First, such dyes are easily smeared on contact by fingers or any moisture. Second, they interact poorly with paper, which causes them to migrate into the paper with the dye's solvents to give poor, diffuse print quality. Finally, the failure of these dyes to interact with and bind to the paper causes inks formed from these dyes to have longer dry times.

Another approach to this problem of the water solubility of dyes has been to attach amino groups to the carbon skeletal structure of the dye molecule to form aromatic amines. Such aromatic amino groups protonate to form a charged species, thus imparting water solubility to the dye. However, such dyes are soluble only at pH levels below 2, which is too acidic for ink since it would adversely affect the paper and printer. Similar dyes possibly having methylene amino groups ($-CH_2-NH_2$) attached to the aromatic nucleus are soluble at pH levels below 5 and provide good print quality and waterfastness. However, inks with a pH below 5 are still considered too acid for ink-jet printing systems, where a neutral pH is ideal in order to avoid corrosion and to be compatible with materials used in the ink-jet printer.

Thus, a need exists in the industry for a dye which is soluble at a pH that is suitable for use in ink-jet printing, which has good water solubility, while at the same time is able to interact strongly with paper.

DISCLOSURE OF THE INVENTION

The general purpose of the present invention is to provide new and improved dyes for use in ink compositions for ink-jet printing in which the dye possesses good water solubility at near neutral pH and good interaction with paper. These dyes possess most, if not all, of the advantages of the above prior art dyes while overcoming their above-mentioned significant disadvantages.

The above general purpose of the present invention is accomplished by providing new dyes in which the aromatic dye molecule has attached to the aromatic nucleus thereof from 2 to 10 alkylamino groups having the formula selected from the group consisting of:

(a) $-(CH_2)_n-NH_2$, where n=2 to 4,
(b) $-NH-(CH_2)_n-NH_2$, where n=2 to 5, and
(c) $-NH-(C_2H_4NH)_xC_2H_4NH_2$, where x=0 to about 100.

The dyes of the invention are provided by a process comprising attaching to the aromatic nucleus of the dye from 2 to 10 alkylamino groups having the above formula. Particular embodiments of attaching the groups include (a) reacting the dye with formaldehyde and hydrogen chloride to form an intermediate dye having methylene chloride substituents and reacting the intermediate dye with an alkylamine compound having the above formula, (b) reacting nucleophilic groups on the dye with excess cyanuric chloride to form an intermediate reactive dye and reacting the intermediate reactive dye with an alkylamine compound having the above formula, and (c) utilizing sulfonated dyes where the sulfonate groups are derivatized to sulfonyl chloride groups (by use of sulfuryl chloride, chlorosulfuric acid, or thionyl chloride, for example), and then the alkylamino group is added to the sulfonyl chloride group, in an overall process which converts the sulfonate groups to a sulfonamide.

The dyes for ink-jet printing provided by the invention have sufficient water solubility to avoid the formation of crust in the ink-jet nozzle. Such dyes also have improved water-fastness, smear-resistance, and drying times. Finally, such dyes form a sharp, high density image.

The foregoing and other advantages and features of the present invention will become more readily apparent from the following more particular description of the preferred embodiments of the invention.

BEST MODES FOR CARRYING OUT THE INVENTION

The dyes in accordance with the present invention are formed by attaching to the aromatic nucleus of the dye from 2 to 10 alkylamino groups having the formula selected from the group consisting of:

(a) $-(CH_2)_n-NH_2$, where n=2 to 4,
(b) $-NH-(CH_2)_n-NH_2$, where n=2 to 5, and
(c) $-NH-(C_2H_4NH)_xC_2H_4NH_2$, where x=0 to about 100.

In the dyes of the present invention, each terminal amino group is insulated from the aromatic nucleus by the Ω-alkylene group, $-(CH_2)_n-$. This insulation reduces the inductive effects from the aromatic nucleus to near zero, moves the amino groups further apart from each other for a reduction of field charge effects, and totally eliminates any resonance effects. Consequently, the dyes of the present invention have been found to be able to undergo multiple protonation of the multiple amino groups to form a multiple charged species comprising aminium ions, to provide high water solubility at near a neutral pH. Each alkylamino group added to the dye molecule further increases its water solubility. It has been found that a dye molecule with from 2 to 10, preferably 4 to 5, alkylamino groups attached to the aromatic nucleus has excellent water solubility at near neutral pH. Consequently, the prior art problem of crusting and blockage of the ink-jet printer nozzles is avoided by the present invention. Furthermore, the paper and ink-jet printing equipment are not adversely affected by the present dye.

The term "alkylamino" is used herein to denote the groups indicated above, which are more precisely defined as an $\Omega$-alkylene amine group and an amino $\Omega$-alkylene amine group. These groups interact strongly with the cellulose structure of paper to provide superior print quality, dot edge sharpness, and water fastness. It has been found that the $\Omega$-alkylene group may contain from 2 to 5 carbon atoms, and preferably 3 or 4 carbon atoms, and is preferably a straight-chain alkylene group. If the $\Omega$-alkylene group contains more than 5 carbon atoms, the solubility of the dye may be decreased and the surface tension of the ink may be reduced.

In accordance with the present invention, the alkylamino group is attached to the aromatic nucleus of the dye molecule, which means it is strongly and permanently bonded to the chromophore.

These alkylamino groups can be used in almost any dye class; azo, -phthalocyanine, anthraquinone, methine, diarylmethine, and triarylmethine dyes are examples of major classes of dyes in which alkylamino groups can be used as solubilizing groups. In the case of the methine, diarylmethine, and triarylmethine dyes, alkylamino groups increase water solubility, because these dyes already carry a positive charge and have some water solubility.

It should be noted, however, that alkylamino groups cannot be directly introduced into sulfonated azo dyes, such as commonly employed in ink-jet printing, since the sulfonate groups would exist in the presence of alkylamino groups, thereby creating Zwitter ions. Forming Zwitter ions in dyes causes the dye to precipitate. However, as will be described in further detail below, if the sulfonate groups are first derivatized to sulfonyl chloride groups, and followed by addition of the alkylamino group to the sulfonyl chloride group, then alkylamino groups can indeed be introduced into such sulfonated azo dyes. The overall process converts sulfonate groups to sulfonamides (the amide part of these particular sulfonamides is substituted with the alkylamino or alkylpolyamino groups), and thus the resulting molecule has no sulfonate groups.

The dye molecule must contain reactive groups which are: (1) capable of reacting with formaldehyde and hydrogen chloride or methylal and hydrogen chloride to produce an intermediate structure Ar—CH$_2$—Cl which is then reacted with a chosen alkylamino compound; or (2) capable of forming an intermediate reactive dye with cyanuric chloride which reacts with a chosen alkylamino compound.

There are several methods of introducing the alkylamino groups into dyes. In one method, the group is added to a solvent or disperse dye. For example, a dye, such as copper phthalocyanine, Pigment Black 1, Solvent Blue 7, Basic Red 2, Solvent Red 23 or 24, or Basic Violet 7, is reacted with formaldehyde or methylal and hydrogen chloride to produce an electrophilic aromatic substitution and yield an intermediate structure having a methylene chloride substituent and the general structure:

Ar—CH$_2$—Cl, where Ar = aromatic nucleus of the dye. This intermediate is then reacted with, such as by slow addition to, an excess of a diamino alkane compound of the formula NH$_2$—(CH$_2$)$_n$—NH$_2$.

where n = 2 to 5 to produce the dye of the present invention having the formula

Ar—CH$_2$—NH—(CH$_2$)$_n$—NH$_2$.

Other methods involve adding the alkylamino group to the starting materials before synthesis of the dye or adding alkyl groups to an existing dye. In the second variation, a solvent dye with nucleophilic groups, such as either Basic Red 2 or phenosafranine, is reacted with ethylene oxide, followed by p-toluenesulfonyl chloride, followed by ammonia to produce the substituted dye. Or, more conveniently, ethylenimine reacted with the dye gives the desired product directly in one step.

In the first variation, a dye such as 2,4-dinitroaniline is diazotized with nitrite, followed by coupling with any of 3-aminoaniline, 2-aminoaniline, or 3-aminophenol. This product is diazotized with nitrite at pH 4 in dioxane/water. The resulting intermediate is then coupled to either 1,5-naphthalenediamine or 5-amino-1-naphthol. The nitro groups on this product are reduced with polysulfide, reacted with ethylene oxide, and derivatized with methane sulfonyl chloride, followed by reaction with ammonia. The final dye molecule has multiple alkylamino groups added thereto.

In another method, the present dyes may be formed by reacting the nucleophilic groups on a solvent soluble, non-reactive dye, such as Mordant Blue 32 with excess cyanuric chloride to form an intermediate reactive dye. The latter is then reacted with either of the above-described aminoalkane compounds to form the dyes of the present invention. Tetraethylenepentamine (TEPA; —NH—(C$_2$H$_4$NH)$_4$C$_2$H$_4$NH$_2$) is the preferred alkyl amine to use in this method.

The following is an example of a method by which alkylamino and alkylpolyamino groups are added to sulfonated dyes. Sulfonate groups, such as on Direct Blue 86, Direct Blue 199, Acid Blue 249, Acid Red 27, Acid Red 52, and Acid Red 73, can be treated with thionyl chloride, or, more preferably, with sulfuryl chloride or chlorosulfonic acid, which converts the sulfonate groups into sulfonyl chloride groups. This reaction is well-known in the dye industry. Aryl sulfonyl chlorides (aryl representing the dye chromophore) readily react with nucleophilic reagents. Alkylamino groups, and particularly polyaminoalkyl compounds, such as TEPA, are excellent nucleophilic reagents. Reacting, then, TEPA with a sulfonyl chloride dye leads directly to polyaminoalkyl dye. This simple two-step process is summarized in the formula below:

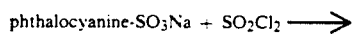

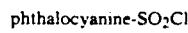

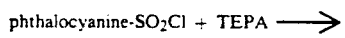

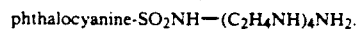

In use, the dyes in accordance with the present invention are incorporated in an ink composition comprising the present dye, water, and a water-miscible organic solvent. Preferably, the dye is present in the amount of about 2 to 8 percent by weight of the composition. The organic solvent may be, for example, ethylene glycol, diethylene glycol, triethylene glycol, polyethylene glycol, propylene glycol, monomethyl ether, 1,2-dimethoxypropane, N-methylpyrrolidone, propylene carbonate, sulfolane, formamide, or lower carbon alcohols, such as methanol, propanol, and mixtures thereof. The water and organic solvent are preferably present in the amounts of 96 to 50 percent and 4 to 50 percent, respectively.

The practice of the present invention is described in greater detail in the Examples herein.

INDUSTRIAL APPLICABILITY

The alkylamino-containing dyes in accordance with the present invention find use in ink compositions for ink-jet printing.

EXAMPLES

EXAMPLE 1

This example illustrates one method for the preparation of dyes in accordance with the present invention. In particular, this example is directed to the preparation of an alkyl amine dye, by conversion of a solvent dye to a solvent dye containing —$CH_2$—Cl groups, followed by reaction with a diamine:

A solution containing 34 grams of Solvent Red 24, 350 milliliters of 12N hydrochloric acid, 4.5 milliliters of sulfuric acid, 60 grams of methylal, and 400 milliliters of purified dioxane is stirred at 75° C. for 6 hours with a stream of gaseous hydrogen chloride slowly bubbling through the mixture. The reaction is dumped into ice water and immediately filtered, and the filtrate is washed on the filter with deionized water.

The filter cake is dried, dissolved in 200 milliliters of purified dry dioxane, and added over the period of one hour to 33 grams of 1,3-diaminopropane in 200 milliliters of purified dry dioxane. After completion of the addition, the solution is stirred at 70° C. for 4 hours while pre-purified nitrogen is slowly bubbled through the solution, then dumped into ice water. The pH of this mixture is adjusted to 10, and extracted with water containing 5% sodium bicarbonate.

The resulting product is a black-reddish dye, soluble in water-15% sulfolane with the pH adjusted to 6.6.

EXAMPLE 2

In this example, the addition of alkyl amine groups to an existing dye by use of ethylenimine is described.

Ethylenimine is prepared as described in Organic Synthesis, Collective Vol. 4, page 433 (1962), using the modification suggested in the Journal of the American Chemical Society, Vol. 73, page 3522 (1951). Six grams of ethylenimine are added to 18 grams aluminum chloride suspended in sulfolane-toluene (50:50) in which 20 grams of Basic Red 2 is dissolved. After heating this mixture at 130° C. for four hours, it is neutralized with potassium carbonate and the solvent is removed under vacuum. The product is dissolved in water, the pH adjusted to 4 with hydrochloric acid, and the aluminum salts removed by centrifugation. The product is then further purified by reverse osmosis through a membrane with a molecular weight cutoff of 300.

EXAMPLE 3

This example describes the synthesis of a dye followed by addition of alkylamine groups, again by use of ethylenimine.

Hydrochloric acid is added to 150 ml water until 14 grams of p-nitroaniline dissolves. Sodium nitrite (7.3 grams) is added with stirring while the solution is maintained at 15° C. and a pH of 3. After one hour, 3.5 grams of sulfamic acid is added to remove excess nitrite.

While maintaining a temperature of 5° C. and a pH of 9 by the drop-wise addition of potassium hydroxide, the above diazo solution is slowly added drop-wise to 9.5 grams 4,8-diaminonaphthalene-1,5-diol, and allowed to stir for two additional hours, after which the product is neutralized and extracted with ethyl ether.

After evaporation of the ether, the above product is dissolved in 50 ml of purified dioxane and added to a 1:1:1 solution of dioxane:propanol:water containing 76 grams hydrated sodium sulfide ($Na_2S.9H_2O$), 37 grams ammonium chloride, and 6 ml of concentrated ammonia, and stirred 14 hours under an atmosphere of nitrogen, at 80° C. The product is recovered by neutralization to pH 8 and extraction with ethyl ether. The ether solution is washed with water, dried over sodium sulfate, and evaporated under vacuum.

Thirteen grams of ethylenimine, described above, is added to a suspension of 25 grams aluminum chloride in toluene in which the above product is dissolved. After heating this mixture at 110° C. for five hours, it is neutralized with potassium carbonate and the solvent removed under vacuum. The product is dissolved in water, the pH adjusted to 2 with hydrochloric acid, washed once with 20 ml of ether, and the insoluble aluminum salts removed from the aqueous solution by centrifugation. The product, 2,6-di-[4-(N-(2-aminoethyl))aminophenylazo]-4,8-di[N-(2-aminoethyl)]amino-1,5-dihydroxynaphthalene, is then further purified by reverse osmosis through a membrane with a molecular weight cutoff of 300.

EXAMPLE 4

This example illustrates the formation and testing of an ink composition in accordance with the present invention.

An ink composition is prepared from 3 grams of the dye prepared in Example 1 or 3 and 15 grams sulfolane and 85 grams water.

The dye evidences excellent water solubility in the vehicle. The ink evidences excellent water fastness on paper, forms ink-jet dots that are rounder than other dyes in the same solvent, and provides a dot of slightly reduced size and increased edge sharpness, thereby resulting in improved print quality.

EXAMPLE 5

One hundred grams of Direct Blue 199 are warmed with 100 grams of sulfuryl chloride for 3 hrs, after which excess sulfuryl chloride is removed under aspirator vacuum. The resultant phthalocyaninesulfonyl chloride is then dumped into, and triturated in, ice water, followed by filtration with washing on the filter. The pasty filtrate is again triturated in ice water containing 230 grams of tetraethylenepentamine (TEPA). The product is precipitated with ammonia, and washed on a filter with more ammoniated water.

Thus, a water-soluble dye has been disclosed, having good solubility at near neutral pH, thus avoiding adverse effects on the paper and printing equipment. Having thus described exemplary embodiments of the present invention, it should be noted by those skilled in the art that the disclosures within are exemplary only and that various other alternatives, adaptations, and modifications may be made within the scope of the present invention.

What is claimed is:

1. An ink-jet ink composition suitable for use in ink-jet printing comprising:
   (a) a vehicle comprising about 96 to 50 percent by weight water and about 4 to 50 percent by weight water-miscible organic solvent; and
   (b) a dye soluble in said vehicle and present in an amount ranging from about 2 to 8 percent by weight of said vehicle comprising an aromatic dye molecule having attached directly to the aromatic nucleus thereof or through a sulfonamide link from 2 to 10 alkylamino groups having the formula selected from the group consisting of:
      (1) $-(CH_2)_n-NH_2$, where $n=2$ to 4,
      (2) $-NH-(CH_2)_n-NH_2$, where $n=2$ to 5, and
      (3) $-NH-(C_2H_4NH)_xC_2H_4NH_2$, where $x=0$ to about 100,
   said ink having a substantially neutral pH.

2. The ink composition of claim 1 wherein said aromatic dye molecule is selected from the group or dye classes consisting of azo, phthalocyanine, anthraquinone, methine, diarylmethine, and triarylmethine.

3. The ink composition of claim 1 wherein said alkylamino group is selected from the group consisting of 2-aminoethyl, 3-aminopropyl, 2-aminoethylamino, 3-aminopropylamino, and tetraethylenepentamino.

4. The ink composition of claim 1 wherein said organic solvent is at least one selected from the group consisting of ethylene glycol, diethylene glycol, triethylene glycol, polyethylene glycol, propylene glycol, monomethyl ether, 1,2-dimethoxypropane, N-methylpyrrolidone, propylene carbonate, sulfolane, formamide, and lower carbon alcohols.

5. The ink composition of claim 1 having from 4 to 5 alkylamino groups.

6. A method for increasing the water solubility of a dye for ink-jet printing comprising attaching directly to the aromatic nucleus of said dye or to a sulfonamide link thereto from 2 to 10 alkylamino groups having the formula selected from the group consisting of:
   (a) $-(CH_2)_n-NH_2$, where $n=2$ to 4,
   (b) $-NH-(CH_2)_n-NH_2$, where $n=2$ to 5, and
   (c) $-NH-(C_2H_4NH)_xC_2H_4NH_2$, where $x=0$ to about 100.

7. The method of claim 6 wherein said dye is selected from the group of dye classes consisting of azo, phthalocyanine, anthraquinone, methine, diarylmethine, and triarylmethine.

8. The method of claim 6 wherein said alkylamino group is selected from the group consisting of 2-aminoethyl, 3-aminopropyl, 2-aminoethylamino, 3-aminopropylamino, and tetraethylenepentamino.

9. The method of claim 6 comprising attaching from 4 to 5 alkylamino groups.

10. The method of claim 6 comprising the steps of:
    (a) reacting said dye with formaldehyde and hydrogen chloride to form an intermediate dye having methylene chloride substituents; and
    (b) reacting said intermediate dye with an alkylamine compound selected from the group consisting of:
       (1) $NH_2-(CH_2)_n-NH_2$, where $n=2$ to 4, and
       (2) $NH_2-(C_2H_4NH)_xC_2H_4NH_2$, where $x=0$ to about 100.

11. The method of claim 6 comprising the steps of:
    (a) reacting nucleophilic groups on said dye with excess cyanuric chloride to form an intermediate reactive dye; and
    (b) reacting said intermediate reactive dye with an alkylamine compound selected from the group consisting of:
       (1) $NH_2-(CH_2)_n-NH_2$, where $n=2$ to 4, and
       (2) $NH_2-(C_2H_4NH)_xC_2NH_2$,
    where $x=0$ to about 100.

12. The method of claim 6 comprising the steps of:
    (a) reacting sulfonate groups on said dye with a reagent to convert said sulfonate groups to sulfonyl chloride groups; and
    (b) reacting said sulfonyl chloride groups with said alkylamino groups to convert said sulfonyl chloride groups to sulfonamide groups.

13. The method of claim 12 wherein said reagent is selected from the group consisting of sulfuryl chloride, chlorosulfonic acid, and thionyl chloride.

14. The method of claim 12 wherein said alkylamino group is selected from the group consisting of tetraethylenepentamino, 2-aminoethyl, 3-aminopropyl, 2-aminoethylamino, and 3-aminopropylamino.

* * * * *